(12) United States Patent
Furukawa et al.

(10) Patent No.: US 12,264,955 B2
(45) Date of Patent: Apr. 1, 2025

(54) COMBINATION WEIGHING DEVICE

(71) Applicant: Ishida Co., Ltd., Kyoto (JP)

(72) Inventors: Takuma Furukawa, Ritto (JP); Satoru Kamigaito, Ritto (JP); Tsuyoshi Ishibashi, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 378 days.

(21) Appl. No.: 17/818,577

(22) Filed: Aug. 9, 2022

(65) Prior Publication Data
US 2023/0105361 A1 Apr. 6, 2023

(30) Foreign Application Priority Data
Oct. 5, 2021 (JP) ................................. 2021-163978

(51) Int. Cl.
*G01G 13/18* (2006.01)
*G01G 13/02* (2006.01)
(Continued)

(52) U.S. Cl.
CPC ............ *G01G 13/18* (2013.01); *G01G 13/026* (2013.01); *G01G 13/243* (2013.01); *G01G 21/22* (2013.01)

(58) Field of Classification Search
CPC .... G01G 13/18; G01G 13/026; G01G 13/243; G01G 21/22; G01G 19/393
(Continued)

(56) References Cited

U.S. PATENT DOCUMENTS 4,529,049 A * 7/1985 Fukuda ................ G01G 13/285
  177/1
4,846,291 A * 7/1989 Osawa ................... G01G 13/18
  177/25.18
(Continued)

FOREIGN PATENT DOCUMENTS

CN 101080616 A 11/2007
CN 101135587 A 3/2008
(Continued)

OTHER PUBLICATIONS

The extended European search report issued by the European Patent Office on Jan. 2, 2023, which corresponds to European Patent Application No. 22187286.4-1001 and is related to U.S. Appl. No. 17/818,577.

*Primary Examiner* — Jacques M Saint Surin
(74) *Attorney, Agent, or Firm* — Studebaker Brackett PLLC

(57) ABSTRACT

A combination weighing device includes: a storage unit that stores time-series measurement values sequentially acquired by the measurement hoppers; a time measurement unit that measures an elapsed time from a timing corresponding to supply of the products to the measurement hoppers until a timing at which the time-series measurement values enter a region considered to be stabilized when the time-series measurement values stored in the storage unit converge to the region considered to be stabilized as a stabilization time until the measurement values become stabilized; and a selection unit that acquires the stabilization times by the time measurement unit over a plurality of cycles and can select a recommended stabilization time that is the stabilization time in which a predetermined measurement accuracy can be maintained based on a standard deviation of the acquired stabilization times for the plurality of cycles.

6 Claims, 5 Drawing Sheets

(51) Int. Cl.
*G01G 13/24* (2006.01)
*G01G 21/22* (2006.01)

(58) Field of Classification Search
USPC .................................................... 177/25.18
See application file for complete search history.

(56) References Cited

U.S. PATENT DOCUMENTS

| | | | | |
|---|---|---|---|---|
| 5,753,867 | A * | 5/1998 | Konishi | G01G 19/393 |
| | | | | 177/25.18 |
| 10,156,471 | B2 * | 12/2018 | Nagai | G01G 23/06 |
| 11,002,773 | B2 * | 5/2021 | Toizumi | G06Q 50/06 |
| 11,613,435 | B2 * | 3/2023 | Yamamoto | G01G 19/393 |
| | | | | 700/220 |
| 2008/0283307 | A1 * | 11/2008 | Kawanishi | G01G 19/393 |
| | | | | 177/25.18 |
| 2019/0291967 | A1 * | 9/2019 | Kamigaito | B65G 43/08 |

FOREIGN PATENT DOCUMENTS

| | | | |
|---|---|---|---|
| CN | 102105098 A | | 6/2011 |
| CN | 108369133 A | | 8/2018 |
| CN | 111238615 A | | 6/2020 |
| EP | 3 236 220 A1 | | 10/2017 |
| JP | S63-208723 A | | 8/1988 |
| JP | H09-113348 A | | 5/1997 |
| JP | 2006300884 A | * | 11/2006 |
| JP | 2011099785 | * | 5/2011 |
| JP | 2017138188 | * | 8/2017 |

\* cited by examiner

COMBINATION WEIGHING DEVICE

TECHNICAL FIELD

One aspect of the present invention relates to a combination weighing device.

BACKGROUND

There is known a combination weighing device that repeats a cycle of supplying products to a plurality of measurement hoppers and performing measurement, obtaining combinations of the plurality of measurement hoppers based on a plurality of obtained measurement values, selecting a combination close to a target weight value among the obtained combinations, and discharging the products from the plurality of measurement hoppers of the selected combination. In such a combination weighing device, a stabilization time until the measurement values are stabilized is set as one of operation timings. Then, for example, the stabilization time from the timing when the product is supplied to the measurement hopper until the measurement values are stabilized is measured, and when the stabilization time elapses, the measurement values of the measurement hopper are acquired. This stabilization time is usually set according to a capability of the combination weighing device. For this reason, for example, in a combination weighing device described in JP-A-9-113348, a stabilization time is determined by acquiring a waveform of time-series measurement values sequentially acquired by a measurement hopper and displaying the waveform of the time-series measurement values on a weighing device or the like, and the stabilization time is set in the device.

However, in the above-mentioned combination weighing device, in some cases, the supplied product may move like dancing in the measurement hopper, for example, according to a type of the product. For this reason, the stabilization time is not always appropriate, and the measurement values obtained after the lapse of the stabilization time may not match a true actual weight of the product. In this case, although the stabilization time needs to be adjusted, there is a situation in that such adjustment is still performed with relying on experience and intuition.

SUMMARY

Therefore, one aspect of the present invention is to provide a combination weighing device capable of setting an appropriate stabilization time without relying on experience and intuition.

According to one aspect of the present invention, there is provided a combination weighing device that repeats a cycle, the cycle including supplying products to a plurality of measurement hoppers, measuring weight of supplied products, obtaining combinations of the plurality of measurement hoppers based on a plurality of obtained measurement values, selecting a combination having a measurement value close to a target weight value among the obtained combinations, and discharging the products from the plurality of measurement hoppers of the selected combination, the combination weighing device including: a storage unit that stores time-series measurement values sequentially acquired by the measurement hoppers; a time measurement unit that measures an elapsed time from a timing corresponding to supply of the products to the measurement hoppers until a timing at which the time-series measurement values enter a region considered to be stabilized when the time-series measurement values stored in the storage unit converge to the region considered to be stabilized as a stabilization time until the measurement values become stabilized; and a selection unit that acquires the stabilization times by the time measurement unit over a plurality of cycles and can select a recommended stabilization time that is the stabilization time in which a predetermined measurement accuracy can be maintained based on a standard deviation of the acquired stabilization times for the plurality of cycles.

In this combination weighing device, the stabilization time that varies each time when the products are put into the measurement hoppers is acquired over the plurality of cycles, and the recommended stabilization time that can maintain the predetermined measurement accuracy can be selected based on the standard deviation obtained from the statistical data of the acquired stabilization time. Accordingly, the appropriate stabilization time can be set without relying on experience and intuition.

In the combination weighing device according to one aspect of the present invention, the time measurement unit may obtain a convergence value of the time-series measurement values stored in the storage unit over a plurality of cycles and may obtain a region having a predetermined range based on the obtained convergence value of each cycle as the region considered to be stabilized. Accordingly, a region that can be regarded to be stabilized can be specifically obtained.

In the combination weighing device according to one aspect of the present invention, the time measurement unit may specify a timing which enters a region where the time-series measurement values are considered to be stabilized by tracing back the time with respect to the time-series measurement values stored in the storage unit. Accordingly, the timing of entering the region where the time-series measurement values can be regarded to be stabilized can be specifically obtained.

In the combination weighing device according to one aspect of the present invention, the selection unit may have a display unit that displays a histogram of the stabilization times for the plurality of cycles and further displays the recommended stabilization time on the histogram. Accordingly, the recommended stabilization time can be easily confirmed with the display unit.

In the combination weighing device according to one aspect of the present invention, the recommended stabilization time may be a time obtained by adding a time corresponding to twice the standard deviation to an average value of the acquired stabilization times for the plurality of cycles. In this case, an appropriate stabilization time can be specifically set.

In the combination weighing device according to one aspect of the present invention, the timing corresponding to the supply of the products to the measurement hoppers may involve at least one of a timing of closing a product discharging gate in the measurement hopper, a timing of opening the product discharging gate in the measurement hopper, and a timing of opening the product discharging gate in a supply hopper for supplying the products to the measurement hopper. In this case, the timing relating to one of the timing of closing the product discharging gate in the measurement hopper, the timing of opening the product discharging gate in the measurement hopper, and the timing of opening the product discharging gate in the supply hopper can be adopted as a starting point of the stabilization time.

DETAILED DESCRIPTION

Figure 1:
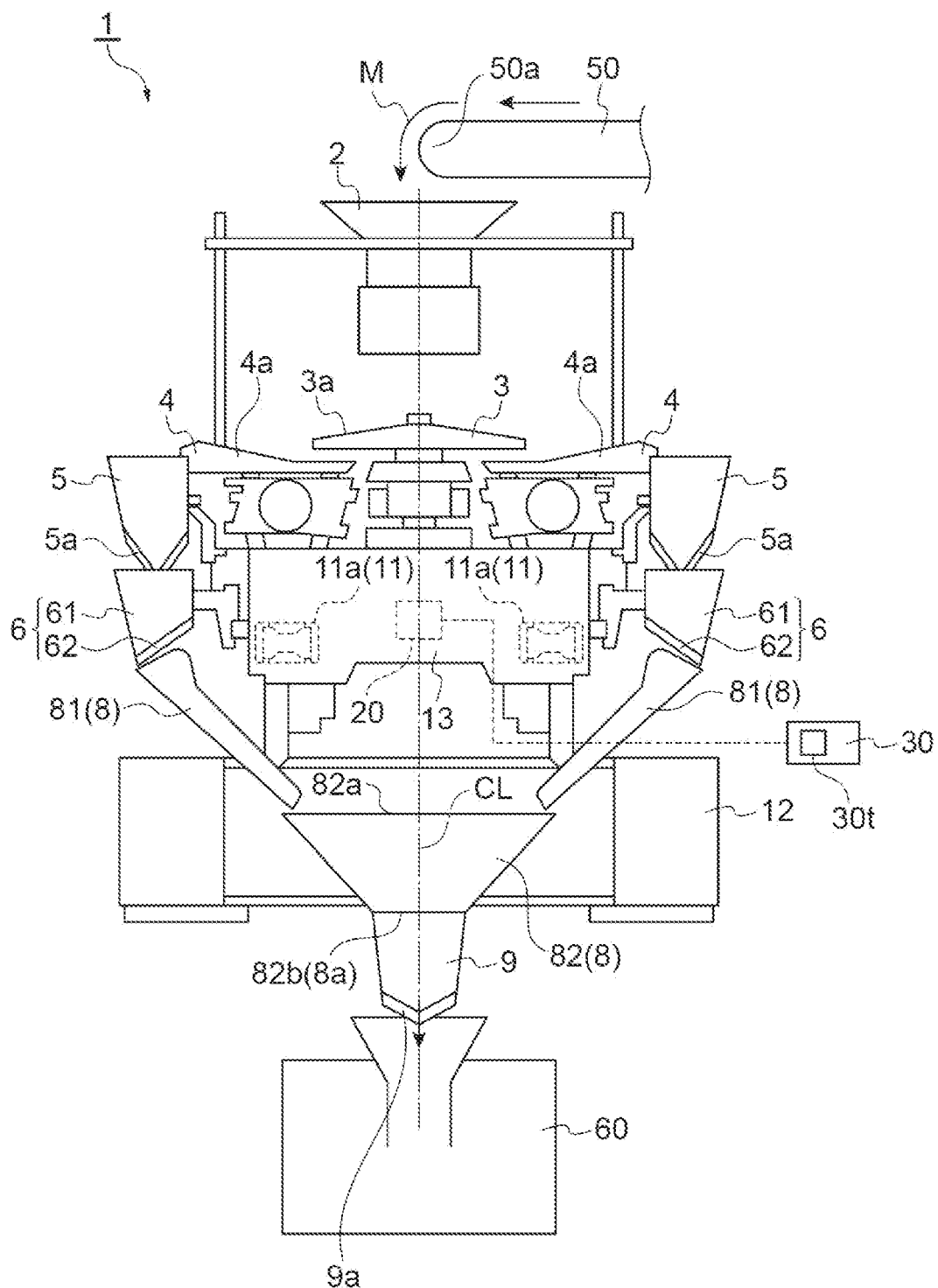
FIG. 1 is a schematic configuration diagram of a combination weighing device according to an embodiment.

Hereinafter, embodiments will be described in detail with reference to the drawings. In each figure, the same or corresponding components are denoted by the same reference numerals, and duplicate description thereof will be omitted.

As illustrated in FIG. 1, a combination weighing device 1 includes a charging chute 2, a distribution feeder 3, a plurality of radiation feeders 4, a plurality of pool hoppers (supply hoppers) 5, and a plurality of measurement hoppers 6, a collecting chute 8, a timing hopper 9, a measurement unit 11, a control unit 20, and an interface 30. The combination weighing device 1 repeats a cycle of supplying products M to a plurality of measurement hoppers 6 and performing measurement, obtaining combinations of the plurality of measurement hoppers 6 based on the obtained measurement values of the plurality of measurement hoppers 6 for the products, selecting a combination of the products M close to a target weight value among the obtained combinations, and discharging the products from the plurality of measurement hoppers 6 of the selected combination.

The combination weighing device 1 measures the product M supplied by a transport conveyor 50 so as to have the target weight value and supplies the product M to a bag manufacturing/packaging machine 60. The transport conveyor 50 is an external device that supplies the product M to the combination weighing device 1. The product M is a product having a variation in a unit mass, such as an agricultural product, a marine product, processed food, and the like.

The charging chute 2 is arranged below a transport end 50a of the transport conveyor 50. The charging chute 2 receives the product M dropped from the transport end 50a of the transport conveyor 50 and discharges the product M downward. The distribution feeder 3 transports the product M supplied from the above toward a peripheral edge. The distribution feeder 3 is arranged below the charging chute 2. The distribution feeder 3 transports the product M on a transport surface 3a to the peripheral edge by allowing an electromagnetic vibrator to vibrate.

The plurality of radiation feeders 4 further transport the product M transported from the distribution feeder 3 in a radial direction. The plurality of radiation feeders 4 are arranged radially along an outer edge of the transport surface 3a of the distribution feeder 3. The radiation feeder 4 transports the product M by allowing the electromagnetic vibrator to vibrate.

The plurality of pool hoppers 5 are arranged so as to surround a center line CL in a vertical direction. Each pool hopper 5 is arranged below a distal end portion of a trough 4a of each radiation feeder 4. Each pool hopper 5 has a gate (product discharging gate) 5a that can be opened and closed. The gate 5a is located at a bottom of the pool hopper 5. Each pool hopper 5 temporarily stores the product M discharged from the distal end portion of the corresponding trough 4a by closing the gate 5a. Each pool hopper 5 discharges the temporarily stored product M downward by opening the gate 5a.

The plurality of measurement hoppers 6 are arranged so as to surround the center line CL. Each measurement hopper 6 is arranged below the gate 5a of each pool hopper 5. Each measurement hopper 6 has a main body portion 61 that accommodates the product M and a gate (product discharging gate) 62 that can be opened and closed at the bottom thereof. The gate 62 is provided in the main body 61. The gate 62 is located at a bottom of the measurement hopper 6. Each measurement hopper 6 temporarily stores the product M discharged from the corresponding pool hopper 5 in the main body 61 by closing the gate 62. Each measurement hopper 6 discharges the product M temporarily stored in the main body 61 downward by opening the gate 62.

The collecting chute 8 collects the products M discharged from each measurement hopper 6 at a discharge port 8a. The discharge port 8a is located on the center line CL below the plurality of measurement hoppers 6. The collecting chute 8 has an upper chute portion 81 and a lower chute portion 82. The upper chute portion 81 receives the product M discharged from each measurement hopper 6 and slides the product M to the discharge port 8a side (that is, the center line CL side and the lower side). The lower chute portion 82 is a conical trapezoidal cylinder tapering downward, and has an upper opening 82a and an lower opening 82b. The lower chute portion 82 uses the lower opening 82b as the discharge port 8a and discharges the product M downward from the discharge port 8a.

The timing hopper 9 is arranged below the discharge port 8a. The timing hopper 9 has a gate 9a that can be opened and closed. The gate 9a is located at a bottom of the timing hopper 9. The timing hopper 9 temporarily stores the product M discharged from the collecting chute 8 by closing the gate 9a. By opening the gate 9a, the timing hopper 9 discharges the temporarily stored product M to the bag manufacturing/packaging machine 60.

The measurement unit 11 is arranged in a case 13 supported by a frame 12. The measurement unit 11 has the plurality of load cells 11a. Each load cell 11a supports the corresponding measurement hopper 6. When the product M is temporarily stored in each measurement hopper 6, the measurement unit 11 measures (acquires) the weight value of each measurement hopper (measurement value corresponding to a mass of the product M). In the present embodiment, the measurement unit 11 acquires time-series measurement values measured in real time (sequentially measured) in at least one of the plurality of measurement hoppers 6.

The control unit 20 is arranged in the case 13. The control unit 20 has a central processing unit (CPU), a read only memory (ROM), a random access memory (RAM), and the like. The control unit 20 controls operations of the respective components of the combination weighing device 1 such as a transport operation of the distribution feeder 3 and the radiation feeder 4, an opening/closing operation of the gate 5a of each pool hopper 5, an opening/closing operation of the gate 62 of each measurement hopper 6, and an opening/closing operation of the gate 9a of the timing hopper 9. The control unit 20 is communicably connected to the bag manufacturing/packaging machine 60.

The control unit 20 stores the measurement values measured by the measurement unit 11 in association with the measurement hopper 6 that stores the product M corresponding to the measurement values. The control unit 20 allows the measurement unit 11 to perform measurement and selects the combination of the products M from the plurality of measurement values of each product M associated with each measurement hopper 6 so that the total value becomes the target weight value. More specifically, the control unit 20 selects the combination of the products M such that the total combination value is close to the target weight value and falls within a predetermined range by combining the measurement values of the products M output by the respective measurement units 11. That is, the control unit 20 calculates the combination of the products M equal to or close to the preset target weight value based on the weight value of the respective products M of the plurality of measurement hoppers 6 acquired by the measurement units 11. Then, the control unit 20 discharges the product M from the measurement hopper 6 of the product M related to the calculated combination.

The interface 30 is a device that receives input of information from a user such as a worker. The interface 30 has a touch panel display (display unit) 30*t* configured with, for example, a liquid crystal display. The interface 30 makes it possible to select the stabilization time (details described later) via the touch panel display 30*t*.

Next, the control unit 20 will be described in detail.

Figure 2:
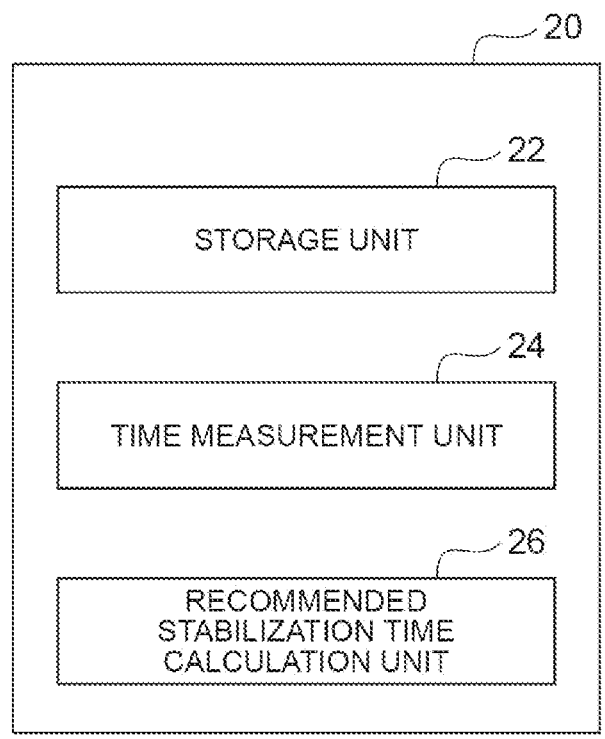
FIG. 2 is a diagram illustrating a functional configuration of a control unit of FIG. 1.

As illustrated in FIG. 2, the control unit 20 includes a storage unit 22, a time measurement unit 24, and a recommended stabilization time calculation unit 26. The control unit 20 has the storage unit 22, the time measurement unit 24, and the recommended stabilization time calculation unit 26 as conceptual components for executing various control processes. Such a conceptual component is configured as software in which, for example, a program stored in the ROM is loaded on the RAM and executed by the CPU.

The storage unit 22 stores information on the operations of the combination weighing device 1. The storage unit 22 stores the time-series measurement values measured in real time by the measurement unit 11 in the measurement hopper 6. The time-series measurement values are data of the measurement values measured over time by the measurement unit 11 during the time period (for example, 3 seconds) including at least one cycle in which the combination weighing device 1 repeats. The time-series measurement values are, for example, data represented by a waveform on a graph having the time and the measurement values on the horizontal axis and the vertical axis, respectively. The storage unit 22 stores and accumulates the time-series measurement values for one or the plurality of measurement hoppers 6 in a plurality of different time periods. The storage unit 22 stores and accumulates the plurality of the above-mentioned stabilization times.

The time measurement unit 24 starts time measurement from the time when the measurement values become unstabilized due to mechanical vibration caused by opening and closing the gates of the measurement hopper 6 or the pool hopper 5. In this case, the time of starting the time measurement is, for example, a timing at which the control unit 20 outputs a drive signal to the gates 5*a* and 62 of the pool hopper 5 and the measurement hopper 6, respectively. From that timing, the measurement values of the measurement hopper 6 are sequentially input and stored in the storage unit 22. The time-series measurement values stored in the storage unit 22 converge to a fluctuation width considered to be within a stabilization region with the lapse of time. In this case, the stabilization region is a preset predetermined range region. The time measurement unit 24 can obtain a convergence value of the time-series measurement values stored in the storage unit 22 over a plurality of cycles and can obtain a region having a predetermined range based on the obtained convergence value of each cycle as the stabilization region. The time measurement unit 24 measures an elapsed time from a timing corresponding to the supply of the products M to the measurement hoppers 6 until a timing at which the time-series measurement values enter the stabilization region when the time-series measurement values stored in the storage unit 22 converge to the stabilization region (a region considered to be stabilized) as the stabilization time until the measurement values become stabilized.

The convergence value for each cycle depends on the supply amount of the products M supplied to the measurement hoppers 6 in each cycle. Further, in the present embodiment, a fluctuation width considered to be within the stabilization region includes not only the fluctuation width when being completely within the stabilization region but also, for example, the fluctuation width when momentarily out of the stabilization region but being within the stabilization region other than that. This fluctuation width is a predetermined upper limit value and is a predetermined lower limit value with the convergence value used as a reference. In the present embodiment, the timing corresponding to the supply of the products M to the measurement hoppers 6 relates to the timing of opening the gate 5*a* in the pool hoppers 5 that supply the products M to the measurement hoppers 6. It is noted that the timing corresponding to the supply of the products M to the measurement hoppers 6 is not particularly limited, but may be the timing of closing the gates 62 in the measurement hoppers 6 or may be the timing of opening the gates 62 in the measurement hoppers 6.

The time measurement unit 24 specifies the timing at which the time-series measurement values enter the stabilization region by tracing back the time with respect to the time-series measurement values stored in the storage unit 22. For example, the measurement values that have converged to the fluctuation width considered to be within the stabilization region expand the fluctuation reversely by tracing back the time. Therefore, when the upper limit or the lower limit of the stabilization region intersect each other as a result of tracing back time with respect to the measurement values that converge to the fluctuation width considered to be within the stabilization region, the time measurement unit 24 specifies the time point as a timing for entering the stabilization region.

The recommended stabilization time calculation unit 26 acquires the stabilization times by the time measurement unit 24 over the plurality of cycles and stores and accumulates the stabilization times in the storage unit 22 as statistical data. The recommended stabilization time calculation unit 26 calculates a standard deviation of the stabilization times for the plurality of cycles stored in the storage unit 22. The recommended stabilization time calculation unit 26 calculates a recommended stabilization time that is the stabilization time in which a predetermined measurement accuracy can be maintained based on the calculated standard deviation. The recommended stabilization time is a time obtained by adding a time corresponding to twice the standard deviation to the average value of the acquired stabilization times for the plurality of cycles.

The recommended stabilization time calculation unit 26 displays a histogram of the stabilization times for the plurality of cycles on the touch panel display 30*t* of the interface 30. The recommended stabilization time calculation unit 26 also displays the recommended stabilization time on the histogram of the touch panel display 30*t*. Accordingly, the interface 30 can select the recommended stabilization time via the touch panel display 30*t*. The recommended stabilization time calculation unit 26 and the interface 30 constitute the selection unit.

Figure 3:
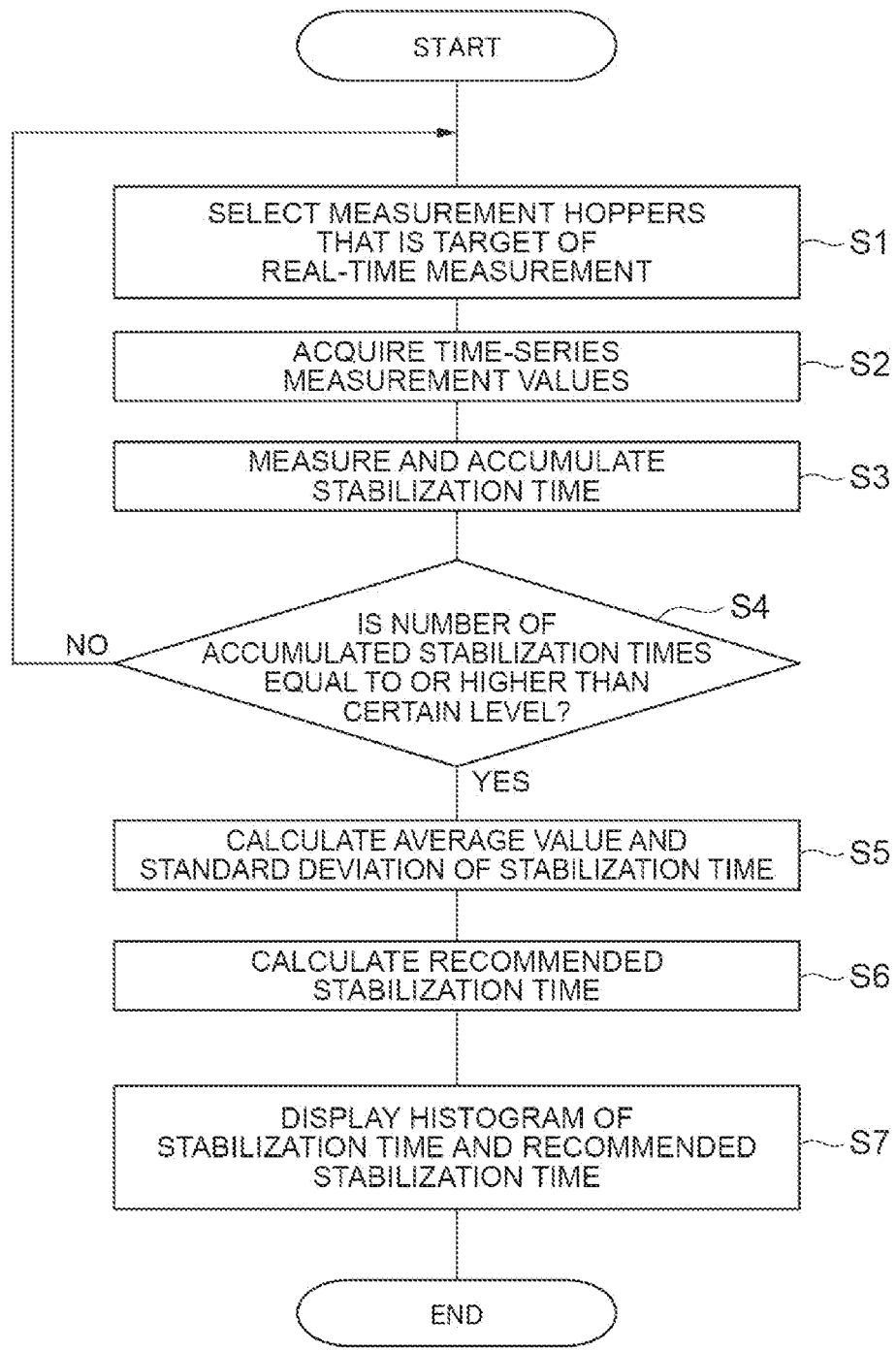
FIG. 3 is a flowchart illustrating an example of processes by a control unit of FIG. 1.

Next, the example of processes in the case where the recommended stabilization time is selectively displayed on the touch panel display 30t by the control unit 20 will be described in detail with reference to the flowchart of FIG. 3.

First, for example, any one of the plurality of measurement hoppers 6 is selected as the measurement hopper 6 that is to be a target of real-time measurement (step S1). The selected measurement hopper 6 is measured in real time, and the time-series measurement value is acquired (step S2). The stabilization time of the acquired time-series measurement values is measured by the time measurement unit 24, and the measured stabilization time is accumulated in the storage unit 22 (step S3).

In the case of NO in step S4 of determining whether or not the number of accumulated stabilization times in the storage unit 22 is equal to or higher than a certain level (step S4), the process returns to step S1. In the case of YES in step S4, the recommended stabilization time calculation unit 26 calculates an average value and a standard deviation of the stabilization time (step S5). The recommended stabilization time calculation unit 26 calculates the recommended stabilization time. Then, the histogram of the stabilization times and the recommended stabilization time are displayed on the touch panel display 30t (step S7).

Figure 4:
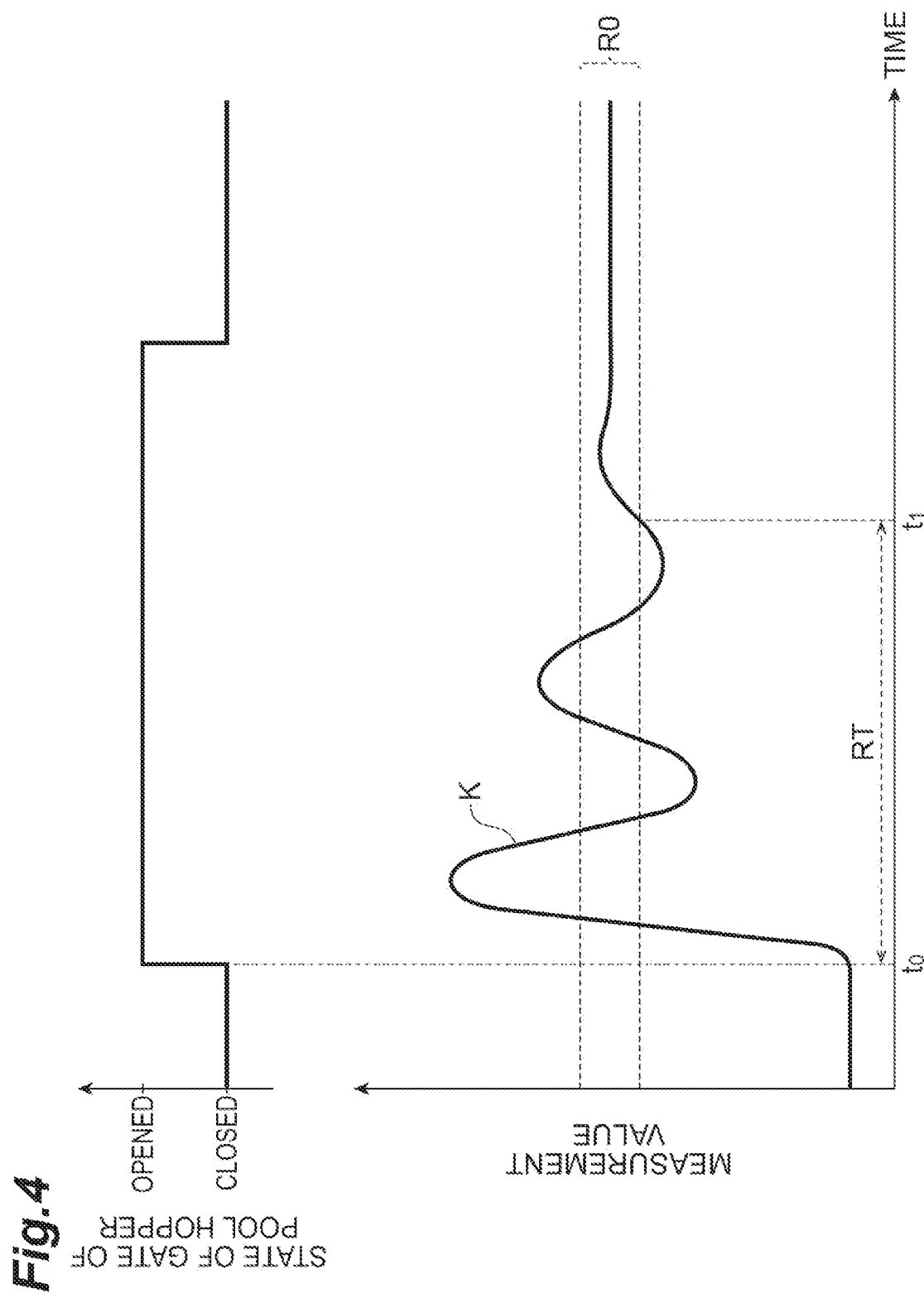
FIG. 4 is a graph illustrating an example of a stabilization time.

FIG. 4 is a graph illustrating an example of a stabilization time S0. In the example of FIG. 4, the example in which the time-series measurement values K are measured in real time is illustrated. In the time-series measurement values K, according to the supply of the product M to the measurement hopper 6 (timing t0 when the gate 5a of the pool hopper 5 is changed from the closed state to the open state), the value is steeply increased to the peak and, after that, while fluctuating in a wave shape, the fluctuation width becomes smaller and converges to the certain convergence value. The timing for opening the gate 5a can be acquired based on the drive signal for the gate 5a. A stabilization region R0 having a predetermined range is set on the time-series measurement values K by using the convergence value as a reference. The time-series measurement values K converge to the fluctuation width that can be considered to be within the stabilization region R0. In this time-series measurement values K, a timing t1 at which the value enters the stabilization region R0 is specified by tracing back the time with respect to the waveform (from right to left in the figure). As the result, the time period from the timing t0 to the timing t1 is acquired as a stabilization time RT.

Figure 5:
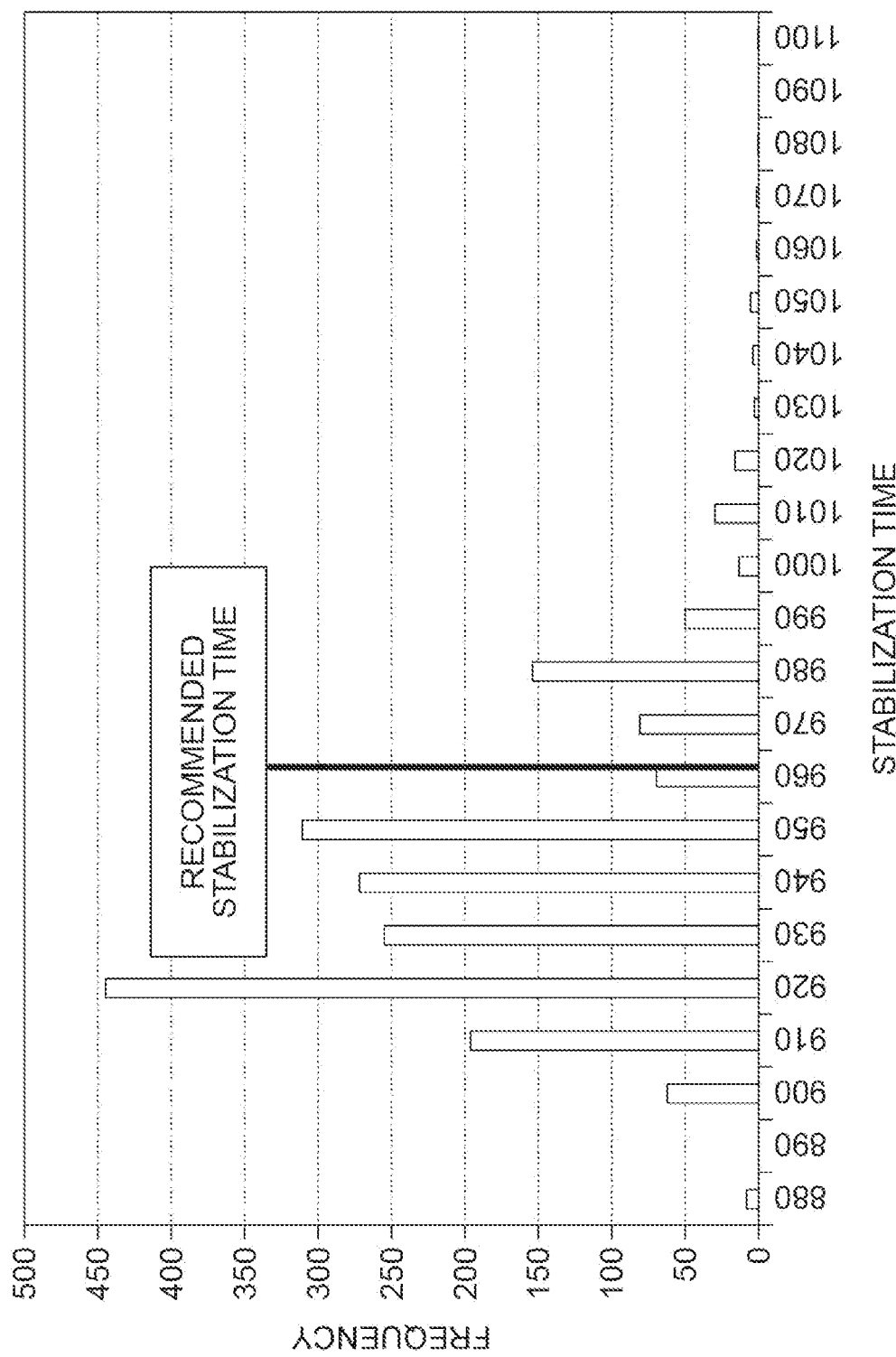
FIG. 5 is a diagram illustrating a display example of a touch panel display.

FIG. 5 is a diagram illustrating a display example of the touch panel display 30t. In the example of FIG. 5, the frequency is illustrated on the vertical axis, and the histogram of stabilization time is illustrated on the horizontal axis. The recommended stabilization time is also displayed on the histogram. By displaying the statistical data of the accumulated stabilization time RT as the histogram, a standard for setting and adjusting the stabilization time RT can be illustrated. In addition, the appropriate stabilization time value is presented as a recommended stabilization time. For example, in this touch panel display 30t, the recommended stabilization time can be selected by touch-selecting the displayed value of the recommended stabilization time or by inputting the displayed value of the recommended stabilization time on the separate screen.

As described above, in the combination weighing device 1, the stabilization time RT that varies each time when the products M are put into the measurement hoppers 6 is acquired over the plurality of cycles, and the recommended stabilization time that can maintain the predetermined measurement accuracy can be selected based on the standard deviation obtained from the statistical data of the acquired stabilization time RT. Accordingly, the appropriate stabilization time RT can be set without relying on experience and intuition.

In the combination weighing device 1, the time measurement unit 24 obtains the convergence value of the time-series measurement values K stored in the storage unit 22 over a plurality of cycles and obtains the region having a predetermined range based on the obtained convergence value of each cycle as the stabilization region R0. Accordingly, the stabilization region R0 can be specifically obtained. Incidentally, the stabilization region R0 may be the fixed value set by, for example, a remote controller.

In the combination weighing device 1, the time measurement unit 24 specifies the timing at which the time-series measurement values K enter the stabilization region R0 by tracing back the time with respect to the time-series measurement values K stored in the storage unit 22. Accordingly, the timing at which the time-series measurement values K enter the stabilization region R0 can be specifically obtained.

In the combination weighing device 1, the interface 30 includes the touch panel display 30t that displays the histogram of the stabilization times RT for the plurality of cycles and also displays the recommended stabilization time on the histogram. Accordingly, the recommended stabilization time can be easily confirmed on the touch panel display 30t.

In the combination weighing device 1, the recommended stabilization time is a time obtained by adding a time corresponding to twice the standard deviation to the average value of the acquired stabilization times RT for the plurality of cycles. In this case, an appropriate stabilization time RT can be specifically set.

In the combination weighing device 1, the timing t0 of supplying the product M to the measurement hopper 6 (corresponding to the supply of the product M to the measurement hopper 6) relates to the timing t0 of opening the gate 5a in the pool hopper 5 for supplying the product M to the measurement hopper 6. In this case, the timing t0 for opening the gate 5a of the pool hopper 5 can be adopted as the starting point of the stabilization time RT.

In the combination weighing device 1, the time until the measurement values converge to the stabilization region R0 is measured as a starting timing at which the measurement values become unstabilized. For example, if the gate 62 of the measurement hopper 6 is closed to receive the product M or the gate 5a of the pool hopper 5 is opened to supply the product M to the measurement hopper 6, the measurement values become unstabilized, so that it is preferable to start the measurement from the timing. This is because these timings can be acquired by the output timing of the drive signal for opening and closing the gates 62 and 5a. However, the timing of starting the time measurement is not limited thereto. For example, when a discharge request signal is received from an external device such as a packaging machine, after a certain time period from that time, in the case where the products M are supplied to the measurement hoppers 6, the stabilization time until the unstabilized measurement values become stabilized may be obtained by starting the time measurement from the time when the discharge request signal is received and subtracting the certain time from the measurement time at that time.

Although one aspect of the present invention has been described above, one aspect of the present invention is not limited to the above-described embodiment.

In the above embodiment, the plurality of pool hoppers 5 and the plurality of measurement hoppers 6 are arranged in an annular shape, but the present invention is not limited thereto, and the pool hoppers 5 and the measurement hoppers 6 may be arranged in a matrix shape. The embodiment and Modified Example may include a plurality of booster hoppers. In the embodiment and Modified Example described above, a portion of functions of the control unit 20 may be executed by another control unit or may be executed by a server capable of communicating with the combination weighing device 1.

In the embodiment and Modified Example described above, the recommended stabilization time may be automatically selected as a stabilization time RT when the recommended stabilization time is calculated. In the embodiment and Modified Example described above, the recommended stabilization time corresponding to the products M may be able to be selected by collecting the stabilization time RT for each product M. In the above-described embodiment and the above-mentioned modification, the better may be able to be selected by collecting the stabilization time RT in association with an actual operating situation (operating rate and defect rate).

According to one aspect of the present invention, it is possible to provide a combination weighing device capable of setting an appropriate stabilization time without relying on experience and intuition.

What is claimed is:

1. A combination weighing device that repeats a cycle, the cycle includes of supplying products to a plurality of measurement hoppers, measuring weight of supplied products, obtaining combinations of the plurality of measurement hoppers based on a plurality of obtained measurement values, selecting a combination having a measurement value close to a target weight value among the obtained combinations, and discharging the products from the plurality of measurement hoppers of the selected combination, the combination weighing device comprising:
    a storage unit that stores time-series measurement values sequentially acquired by the measurement hoppers;
    a time measurement unit that measures an elapsed time from a timing corresponding to supply of the products to the measurement hoppers until a timing at which the time-series measurement values enter a region considered to be stabilized when the time-series measurement values stored in the storage unit converge to the region considered to be stabilized as a stabilization time until the measurement values become stabilized; and
    a selection unit that acquires the stabilization times by the time measurement unit over a plurality of cycles and is configured to select a recommended stabilization time that is the stabilization time in which a predetermined measurement accuracy is configured to be maintained based on a standard deviation of the acquired stabilization times for the plurality of cycles.

2. The combination weighing device according to claim 1, wherein
    the time measurement unit obtains a convergence value of the time-series measurement values stored in the storage unit over a plurality of cycles and obtains a region having a predetermined range based on the obtained convergence value of each cycle as the region considered to be stabilized.

3. The combination weighing device according to claim 1, wherein
    the time measurement unit specifies a timing which enters a region where the time-series measurement values are considered to be stabilized by tracing back the time with respect to the time-series measurement values stored in the storage unit.

4. The combination weighing device according to claim 1, wherein
    the selection unit has a display unit that displays a histogram of the stabilization times for the plurality of cycles and further displays the recommended stabilization time on the histogram.

5. The combination weighing device according to claim 1, wherein
    the recommended stabilization time is a time obtained by adding a time corresponding to twice the standard deviation to an average value of the acquired stabilization times for the plurality of cycles.

6. The combination weighing device according to claim 1, wherein
    the timing corresponding to the supply of the products to the measurement hoppers involves at least one of a timing of closing a product discharging gate in the measurement hopper, a timing of opening the product discharging gate in the measurement hopper, and a timing of opening the product discharging gate in a supply hopper for supplying the products to the measurement hopper.

* * * * *